(12) United States Patent
Marelli et al.

(10) Patent No.: US 8,347,201 B2
(45) Date of Patent: Jan. 1, 2013

(54) READING METHOD OF A MEMORY DEVICE WITH EMBEDDED ERROR-CORRECTING CODE AND MEMORY DEVICE WITH EMBEDDED ERROR-CORRECTING CODE

(75) Inventors: Alessia Marelli, Dalmine (IT); Valeria Intini, Putignano (IT); Roberto Ravasio, Ponte San Pietro (IT); Rino Micheloni, Turate (IT)

(73) Assignee: Micron Technology, Inc., Boise, ID (US)

( * ) Notice: Subject to any disclaimer, the term of this patent is extended or adjusted under 35 U.S.C. 154(b) by 114 days.

(21) Appl. No.: 13/047,678

(22) Filed: Mar. 14, 2011

(65) Prior Publication Data

US 2011/0167318 A1  Jul. 7, 2011

Related U.S. Application Data

(63) Continuation of application No. 11/713,376, filed on Mar. 1, 2007, now Pat. No. 7,908,543.

(30) Foreign Application Priority Data

Mar. 2, 2006 (EP) .................................. 06425141

(51) Int. Cl.
  *G06F 7/02* (2006.01)
  *H03M 13/00* (2006.01)

(52) U.S. Cl. ...................................................... 714/819

(58) Field of Classification Search .............. 714/48, 714/54, 746, 763, 819
See application file for complete search history.

(56) References Cited

U.S. PATENT DOCUMENTS

| | | | |
|---|---|---|---|
| 6,219,282 B1 * | 4/2001 | Tanaka | 365/185.33 |
| 6,389,571 B1 | 5/2002 | Yang | |
| 6,611,938 B1 * | 8/2003 | Tanaka et al. | 714/763 |
| 6,990,622 B2 | 1/2006 | Davis | |
| 7,099,194 B2 * | 8/2006 | Tu et al. | 365/185.18 |

FOREIGN PATENT DOCUMENTS

| | | |
|---|---|---|
| EP | 0305987 A2 | 3/1989 |
| EP | 0305987 A3 | 3/1989 |
| EP | 0428396 A2 | 5/1991 |
| EP | 0428396 A3 | 5/1991 |
| WO | 2006/010685 A1 | 2/2006 |

OTHER PUBLICATIONS

Sundberg, Carl-Erik W., "Erasure and Error Decoding for Semiconductor Memories," Aug. 1978, IEEE Transactions on Computers, vol. C-27, No. 8, pp. 696-705.
European Search Report, EP 88114183, dtd Apr. 26, 1990.
European Search Report, EP 90312403, dtd Feb. 14,1992.
European Search Report, EP 06425141.6, dtd Nov. 28, 2006.

* cited by examiner

*Primary Examiner* — Shelly A Chase
(74) *Attorney, Agent, or Firm* — Knobbe, Martens, Olson & Bear LLP (57) ABSTRACT

A reading method for a memory device with error-correcting encoding envisages the steps of: carrying out a first reading of a plurality of memory locations (A0, A1, . . . , ALS-1) to generate a first recovered string (S1), and performing a first decoding attempt using the first recovered string (S1). When the first decoding attempt fails, the memory locations are read at least one second time, and at least one second recovered string (S2-SN) is generated. On the basis of a comparison between the first recovered string (S1) and the second recovered string (S2-SN), a modified string (SM) is generated, in which erasures (X) are located, and at least one second decoding attempt is carried out using the modified string (SM).

20 Claims, 7 Drawing Sheets

Fig. 11

READING METHOD OF A MEMORY DEVICE WITH EMBEDDED ERROR-CORRECTING CODE AND MEMORY DEVICE WITH EMBEDDED ERROR-CORRECTING CODE

PRIORITY CLAIM

The present application is a continuation application of U.S. patent application Ser. No. 11/713,376, filed Mar. 1, 2007, now issued as U.S. Pat. No. 7,908,543, which claims priority from European Patent Application No. 06425141.6 filed Mar. 2, 2006, the disclosures of which are hereby incorporated by reference in their entireties for all purposes except for those sections, if any, that are inconsistent with this specification.

BACKGROUND OF THE INVENTION

1. Technical Field of the Invention

The present invention relates to a reading method for a memory device with embedded error-correcting code and to a memory device with embedded error-correcting code.

2. Description of Related Art

As is known, some memory devices, especially of a non-volatile type and, in particular, NAND Flash memories, intrinsically suffer from a high reading/writing bit error rate (BER). In order to overcome this problem, memory devices which are more error prone are today provided with encoding and decoding modules based upon error-correcting codes (ECCs). In practice, ECCs add a pre-determined number of control bits to the usable information that must be stored and enable automatic correction of a given number of errors that may occur both during the writing step and during the reading step. The correction capacity of a code is calculated on the basis of the number of parity bits and the length of the word of the code.

A type of cyclic ECC used successfully is the BCH (Bose-Chaudhuri-Hocquenghem) code, which is well known and widely exploited in the telecommunications sector.

Many nonvolatile memory devices are, however, also subjected to degradation with use, so that the reading/writing error rate tends to increase over time. For example, in Flash memories, both of a NAND type and of a NOR type, the gate oxide of the cells degrades on account of ageing and electrical stresses. Consequently, the distributions of the threshold voltage values associated with the various programming levels of the cells tend to approach and to overlap one another so that reading errors become inevitable. In practice, as drifts in the threshold-voltage distributions of a cell arise, the result of the reading/writing process becomes increasingly random (more precisely, the sensitivity to random fluctuations increases and hence also the likelihood increases of two successive readings of the same cell in the same configuration yielding different results).

Consequently, over time the average number of reading/writing errors exceeds the correction capacity of the ECC, and the memory device becomes unreliable.

There is a need in the art to overcome the limitations described above, and, in particular, to prolong the useful life of a memory device with ECC.

SUMMARY OF THE INVENTION

Generally speaking, the present invention concerns a reading method of a memory device with embedded error-correcting code and a memory device with embedded error-correcting code.

In an embodiment, a reading method for a memory device with embedded error-correcting code (ECC) comprises: executing a first reading of a plurality of memory locations, to generate a first recovered string; performing a first decoding attempt using said first recovered string; performing at least one second reading of said memory locations to generate at least one second recovered string if said first decoding attempt failed; comparing said first recovered string and at least said second recovered string to generate a modified string in which erasures are located; and executing at least one second decoding attempt using said modified string.

In another embodiment, a memory device with embedded error-correcting code (ECC), comprises: a memory array; a read circuit for reading said memory array and generating recovered strings; and an error-correcting encoding and decoding device, including a decoding module for decoding said strings. The error-correcting encoding and decoding device comprises an erasure-locator module, selectively activatable when said decoding module fails a first decoding attempt using one said first recovered string generated by said read circuit following upon a first reading of said memory locations. The erasure-locator module requests at least one second reading of said memory locations, receives at least one further recovered string generated by said read circuit on the basis of said at least one second reading of said memory locations, generates, on the basis of a comparison between said first recovered string and at least said second recovered string, a modified string in which erasures are located, and supplies said modified string to said decoding module for a second decoding attempt, using said modified string.

In an embodiment, a reading method for a memory device comprises: executing a first reading of a plurality of memory locations, to generate a first recovered string encoded with an error correcting code; first decoding of said first recovered string; executing at least one second reading of said memory locations to generate at least one second recovered string if said first decoding fails; comparing said first recovered string and at least said second recovered string to generate a modified string which includes an identification of bit erasures; and second decoding of said modified string.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION

The invention exploits the capacity of cyclic error-correcting codes (ECCs) normally used in the telecommunications sector for correcting the so-called erasures, which occur when a receiver is not able to assign a value to a bit in a stream, for example, on account of a disturbance. It should be noted that erasures are different from errors. An erasure corresponds to a missing or indeterminate value in a known position of the stream, whereas an error occurs when, at the receiver end, a value is attributed to a bit in a stream different from the corresponding transmitted bit. The errors can be detected (and corrected) only in the decoding step, exploiting the correction capacity of the ECC. The position of the erasures in the stream is instead known already prior to decoding. For this reason, it is possible to correct a number of erasures greater than the number of errors.

The relation between the number of erasures and the number of errors that can be corrected by an error-correcting code is defined by the following inequality:

$$2\text{ERR} + \text{ERS} < D \qquad (1)$$

where ERR is the number of errors, ERS is the number of erasures, and D is the Hamming distance between two adjacent words of the ECC. In other words, decoding fails if the number of errors ERR and the number of erasures ERS are such that the inequality (1) is not verified.

Figure 1:
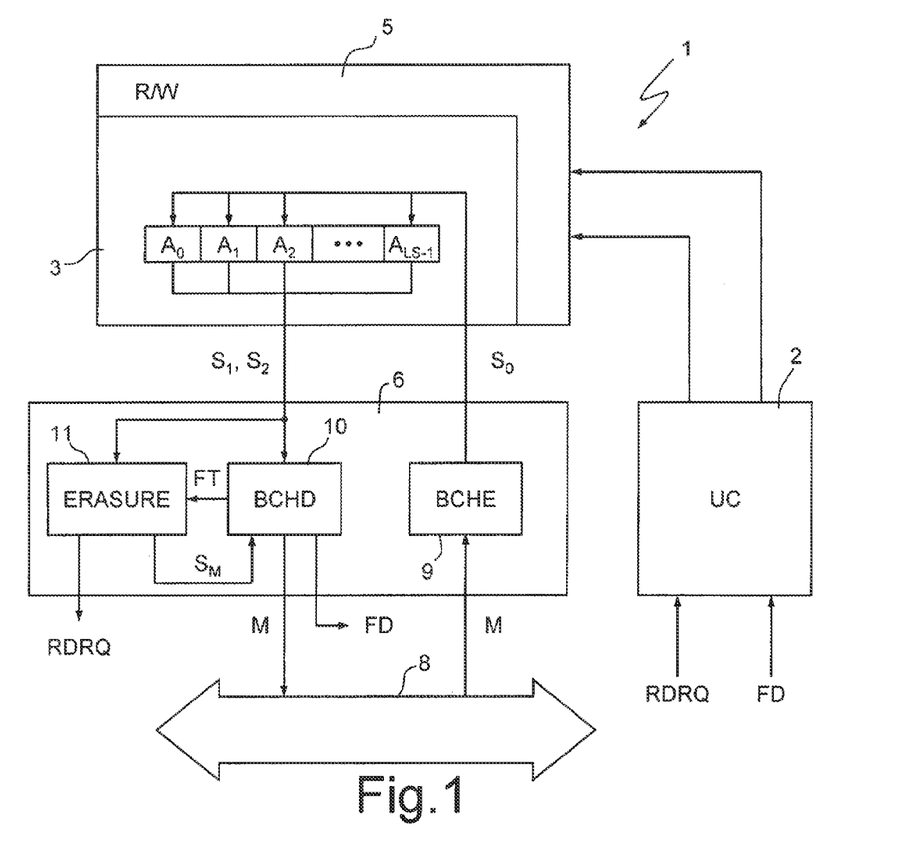
FIG. 1 is a simplified block diagram of a memory device implementing a reading method according to a first embodiment of the present invention.

With reference to FIG. 1, the reference number 1 designates a nonvolatile-memory device with an embedded ECC. In the embodiment described herein, the memory device is a NAND Flash memory. It is understood, however, that the invention can be exploited in volatile and nonvolatile memory devices of any type, in particular NOR Flash memories and bulk memories with magnetic or optical medium such as hard disks, floppy disks, compact disks, DVDs, etc.

The memory device 1 comprises a control unit 2, an array 3 of memory cells (not shown individually), a read/write (or R/W) circuit 5, an ECC encoding/decoding device 6 and a data bus 8.

In addition, in the embodiment described, the ECC encoding/decoding device 6 is based upon the use of a BCH code and comprises an encoding module 9, a decoding module 10, and an erasure-locator module 11. The use of a BCH code must not, however, be considered limiting, in so far as any cyclic embedded error-correcting code can be used.

When a writing operation is carried out, a message M of a pre-determined length is loaded into the encoding module 9 from the data bus 8 and encoded by a known procedure, not described herein. An origin string $S_0$ of length LS, obtained by encoding the message M, is then stored in the array 3 at memory locations $A_0, A_1, \ldots, A_{LS-1}$ (each bit of the origin string $S_0$ is stored in a cell corresponding to an addressed memory location; in the case of multilevel memories, a number of bits is stored in a single cell). For this purpose, the control unit 2 issues a command for writing W appropriately synchronized with the R/W circuit 5.

Assume, for convenience, that, in a subsequent reading step, the same memory locations $A_0, A_1, \ldots, A_{LS-1}$, in which the origin string $S_0$ had been previously stored, are read. The control unit 2 sends a read command R to the R/W circuit 5, and a recovered string $S_1$ is loaded into the decoding module 10, which carries out a first decoding attempt. In the absence of reading and/or writing errors, the recovered string $S_1$ coincides with the origin string $S_0$, the first decoding attempt succeeds, and the decoding module 10 returns the message M, which is made available on the data bus 8. However, the first decoding attempt is successful and the message M is returned even if the number of errors ERR in the recovered string $S_1$ (irrespective of whether they have been generated in the reading step or in the writing step) is less than half the Hamming distance D between adjacent words of the BCH code.

Owing to ageing of the array 3, however, it may happen that the number of errors ERR exceeds the correction capacity of the BCH code. In this case, the first decoding attempt fails, and the decoding module 10, by a temporary failure signal FT, activates the erasure-locator module 11 to carry out a procedure of erasure identification. The procedure of erasure identification, which will be illustrated in detail hereinafter, includes one or more further decoding attempts.

If one of the further decoding attempts is successful, the message M is returned and made available on the data bus 8. Otherwise, the decoding module 10 issues a definitive-failure signal FD to the control unit 2, and the reading operation terminates.

Figure 2:
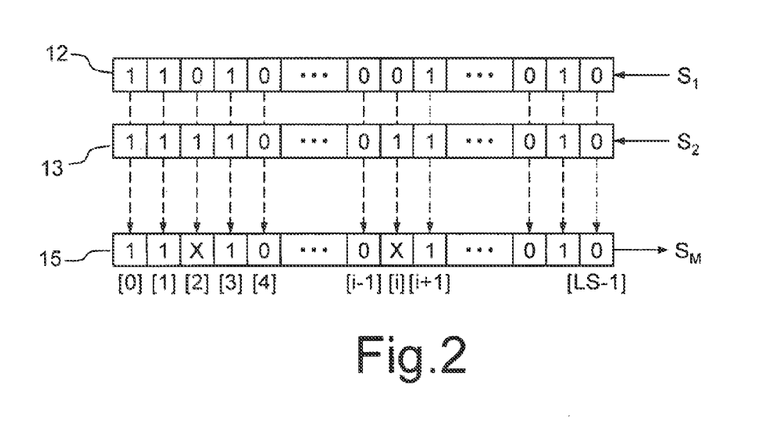
FIG. 2 is a more detailed block diagram of a part of the memory device of FIG. 1.

FIG. 2 is a schematic illustration of the structure of the erasure-locator module 11, which comprises two read registers 12, 13 and an auxiliary register 15. The read registers 12, 13 contain a number of bits equal to the length LS of the recovered string $S_1$, whereas the auxiliary register 15 is capable of storing at least three values for each bit of the recovered string $S_1$ (in the case described, hence, the auxiliary register 15 comprises two bits for each bit of the recovered string $S_1$).

Figure 3:
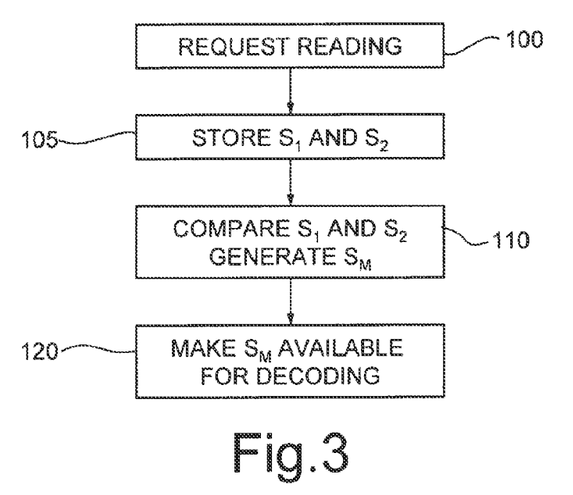
FIG. 3 shows a flowchart relating to the method according to the first embodiment of the invention.

FIG. 3 shows a flowchart relating to the erasure-location procedure carried out by the erasure-locator module 11. When it is activated following upon a failed decoding attempt, the erasure-locator module 11 sends a read-request signal RDRQ to the control unit 2 in order to request a new reading of the memory locations $A_0, A_1, \ldots, A_{LS-1}$ of the array 3 already read (block 100). The recovered string $S_1$ and a further recovered string $S_2$, acquired following upon the new reading request, are loaded into the read registers 12, 13 of the erasure-locator module 11 (block 105). The recovered string $S_2$ can differ in some bits from the recovered string $S_1$ because some of the cells that have caused failure of the preceding decoding attempt are in a critical condition of the threshold voltage drift. In other words, the drift of the threshold-voltage distributions causes a high sensitivity to random fluctuations of the electrical quantities involved during the read/write operations, and hence successive readings of the same cell in the same conditions can yield different results.

A bit-to-bit comparison of the recovered strings $S_1$, $S_2$ is then made, and the result of the comparison is stored in the auxiliary register 15 (block 110). In greater detail, if two corresponding bits of the recovered strings $S_1$, $S_2$ have the same value (value 0 or value 1), this value is stored in the corresponding position of the auxiliary register 15 (FIG. 2). In the positions of the auxiliary register 15 corresponding to discordant bits of the recovered strings $S_1$, $S_2$, an erasure indicator X is stored. Consequently, at the end of this step, the auxiliary register 15 contains a modified string $S_M$ in which there are stored the values of the bits of the recovered strings $S_1$, $S_2$ that have yielded concordant reading results and, possibly, erasure indicators X, in positions corresponding to bits, the value of which could not be determined, because the readings did not yield the same result.

Next (block 120), the modified string $S_M$ is made available to the decoding module 10, which is configured for decoding strings containing erasures.

Figure 4:
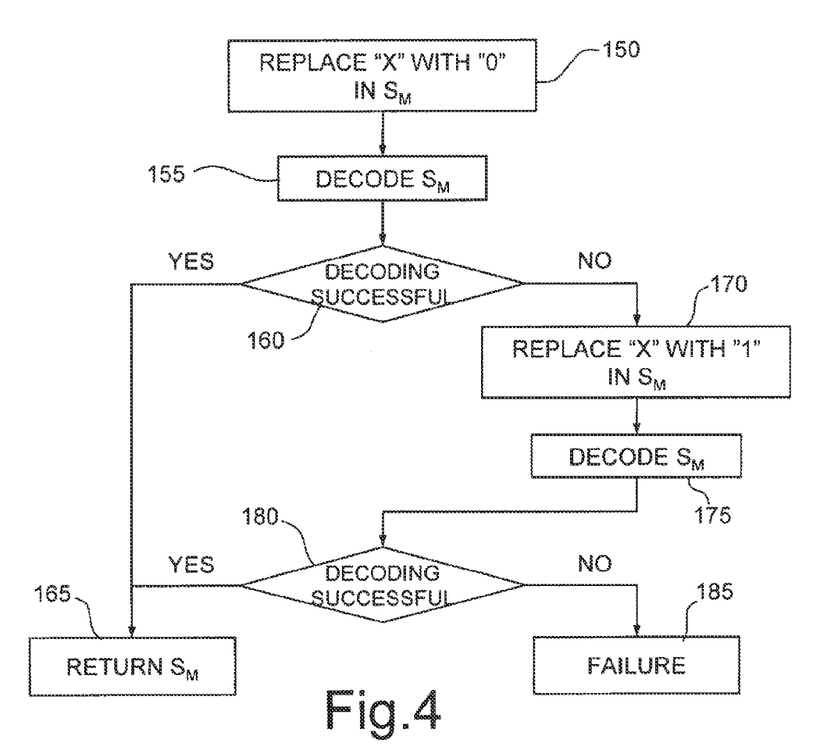
FIG. 4 shows a flowchart relating to the method according to the invention.

The decoding procedure is illustrated in FIG. 4. Initially, the erasure indicators X are replaced with the value 0 (block 150), and a second decoding attempt is made (after the first decoding attempt of the recovered string $S_1$ has failed), also exploiting the information on the position of the erasures in the modified string $S_M$ (block 155). Decoding with erasure handling is executed according to a known method, which envisages calculating the syndromes, searching for the error-locator polynomial by the Berlekamp recursive algorithm and searching for the roots of the error-locator polynomial by applying the Chien algorithm.

If the second decoding attempt is successful (output YES from block 160), the message M is returned and made available on the data bus 8 (block 165).

Otherwise (output NO from block 160), the decoding module 10 replaces the erasure indicators X with the value 1 (block 170) and makes a third decoding attempt, still using the modified string $S_M$ (block 175).

If the third decoding attempt is successful (output YES from block 180), the message M is returned and made available on the data bus 8 (block 165).

If, instead, also the third decoding attempt fails (output NO from block 180), the decoding module 10 generates the definitive-failure signal FD (block 185), and the reading operation terminates.

In practice, re-reading advantageously enables identification of the memory locations corresponding to cells that yield incoherent reading results. The corresponding positions of the modified string can be labeled as erasures, improving the likelihood of the decoding being successful after the first failure of the conventional BCH code (a fact that always occurs when the number of errors exceeds the correction capacity of the code). In this way, the life of the memory device 1 is prolonged.

Figure 5:
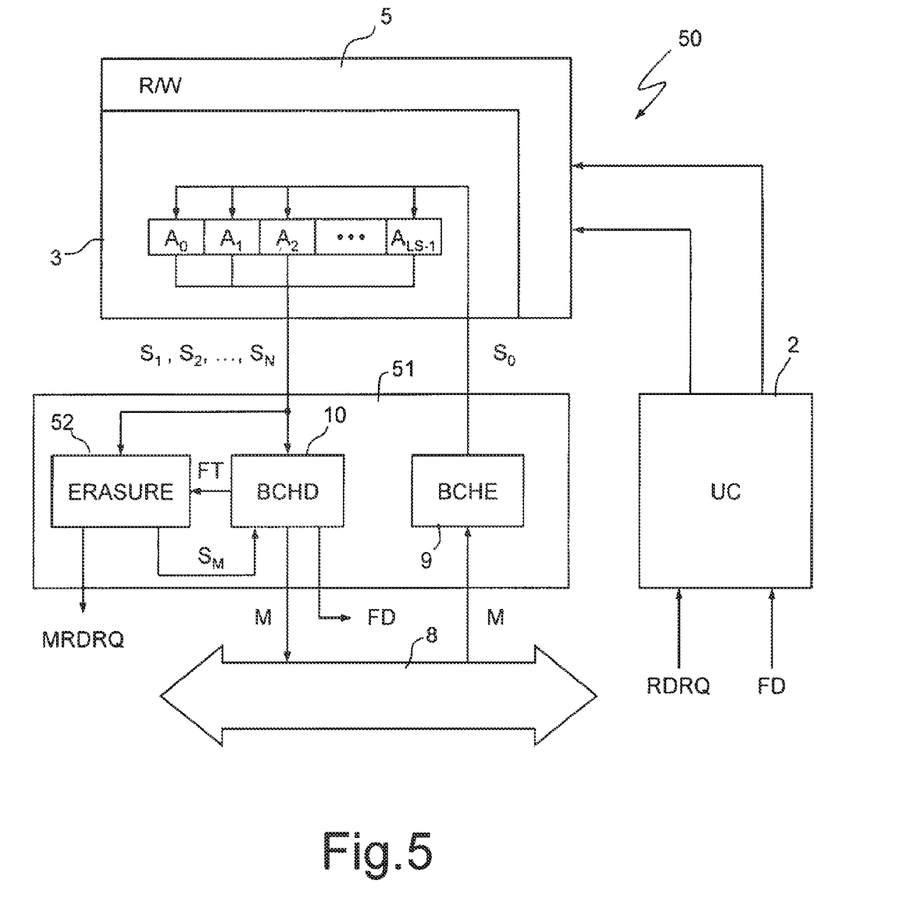
FIG. 5 is a simplified block diagram of a memory device implementing a reading method according to a second embodiment of the present invention.
Figure 6:
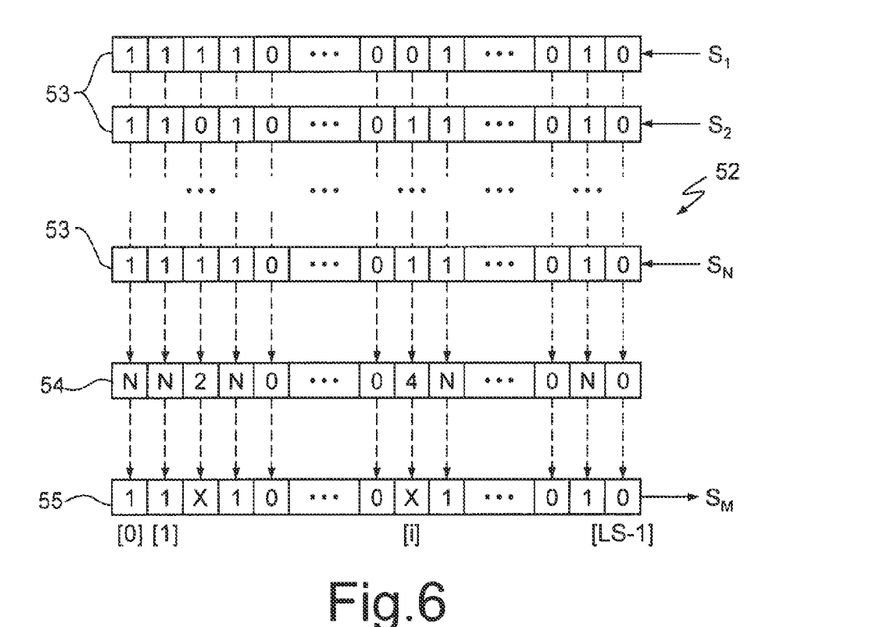
FIG. 6 is a more detailed block diagram of a part of the memory device of FIG. 5.
Figure 7:
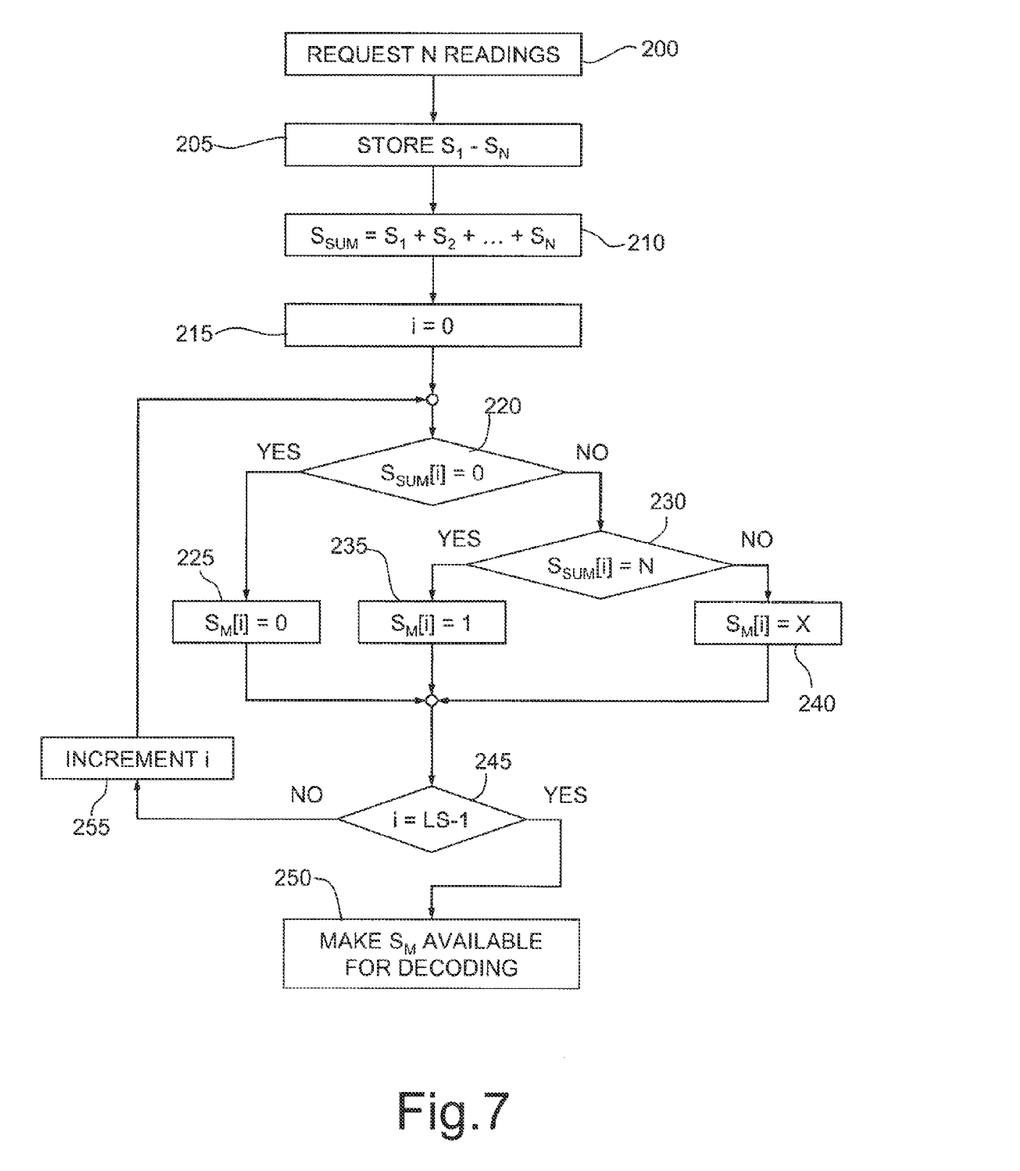
FIG. 7 shows a flowchart relating to the method according to the second embodiment of the invention.

A second embodiment of the invention is illustrated in FIGS. 5-7, where parts that are the same as the ones already described are designated by the same reference numbers.

In this case (FIG. 5), a memory device 50 comprises the control unit 2, the array 3 of memory cells, the read/write (R/W) circuit 5, an EGG encoding/decoding device 51, and the data bus 8.

In addition, the ECC encoding/decoding device 6, based upon the use of a BCH code, comprises the encoding module 9, the decoding module 10 and an erasure-locator module 52, which has the structure illustrated in FIG. 6. In particular, the erasure-locator module 52 comprises a plurality of read registers 53 (five in the example described), a sum register 54 and an auxiliary register 55. The read registers 53 have a number of bits equal to the length LS of the recovered string $S_1$, while the sum register 54 contains an integer number for each bit of the recovered string $S_1$ (in practice, LS integer numbers), and the auxiliary register 55 is able to store three values per bit of the recovered string $S_1$.

If, in the reading step, a first decoding attempt of the recovered string $S_1$, the erasure-locator module 52 is activated and executes a location procedure, which will be described hereinafter with reference to FIG. 7.

Upon activation, the erasure-locator module 52 requests a multiple re-reading of the memory locations $A_0, A_1, \ldots, A_{LS-1}$ already read, by a multiple-read request signal MRDRQ (block 200). In this way, in all N recovered strings $S_1, S_2, \ldots, S_N$ (for example N=5) are acquired, which are stored in respective read registers 53 (block 205).

A bit-to-bit addition of the recovered strings $S_1, S_2, \ldots, S_N$ is made, and the results are stored in corresponding positions of the sum register 54, thus defining therein a sum string $S_{SUM}$ (block 210). In practice, if all of the bits in a generic i-th position of the recovered strings $S_1, S_2, \ldots, S_N$ have the value 0, the corresponding position $S_{SUM}[i]$ of the sum string $S_{SUM}$ contains the value 0; if all of the bits in the i-th position of the recovered strings $S_1, S_2, \ldots, S_N$ have the value 1, the corresponding position $S_{SUM}[i]$ of the sum string $S_{SUM}$ contains the value N; finally, if the bits in the i-th position of the recovered strings $S_1, S_2, \ldots, S_N$ have discordant values, the corresponding position $S_{SUM}[i]$ of the sum string $S_{SUM}$ contains a value comprised between 1 and N-1 and equal to the number of bits having the value 1.

The sum string $S_{SUM}$ is then scanned to perform location of the erasures. At the end of this step, which will be described hereinafter, the auxiliary register 55 contains a modified string $S_M$, which has erasure indicators X in positions corresponding to the memory locations $A_0, A_1, \ldots, A_{LS-1}$ that have yielded discordant reading results. After a counter i has been initialized (block 215), the erasure-locator module 52 checks whether the value stored in the current position $S_{SUM}[i]$ of the sum string $S_{SUM}$ indicated by the counter i is equal to 0 (block 220). If so (output YES from block 220), the readings have returned concordantly the value 0, which is hence assigned to the position $S_M[i]$ of the modified string $S_M$ indicated by the counter i (block 225).

Otherwise (output NO from block 220), the erasure-locator module 52 checks whether the value stored in the current position $S_{SUM}[i]$ of the sum string $S_{SUM}$ is equal to N (block 230). If this condition is verified (output YES from block 230), the readings have returned concordantly the value 1, which is assigned to the position $S_M[i]$ of the modified string $S_M$ (block 235). If, instead, the condition is not verified (output NO from block 230), at the position $S_M[i]$ of the modified string $S_M$ an erasure indicator X is stored, since there have been discordant readings (block 240).

If the counter i indicates that the entire sum string $S_{SUM}$ has been scanned (i.e., i=LS-1, output YES from block 245), the modified string $S_M$ is made available to the decoding module 10 (block 250) for being decoded as already explained with reference to FIG. 4 (substitution of the erasure indicators with the value 0 and second decoding attempt; possibly, in the case of failure of the second decoding attempt, substitution of the erasure indicators with the value 1 and third decoding attempt). If, instead, the scanning of the sum string $S_{SUM}$ is not yet terminated (output NO from block 245), the counter i is incremented (block 255) and the operations indicated in blocks 220-240 are repeated.

Note that, using the procedure described, the corresponding bits of the recovered strings are in effect compared with one another, and the value of the bit in the corresponding position of the sum string $S_M$ is decided on the basis of the result of the comparison (the sum, in practice, supplies in a synthetic way of the result of the bit-to-bit comparison). If there is concordance, it is possible to determine also the value of the bit in the corresponding position of the sum string $S_M$. Otherwise, an erasure is located, and an erasure indicator X is inserted in the sum string $S_M$.

In the embodiment just described, reading repeatedly the same locations of the array 3 increases the likelihood of identification of unstable cells, which yield discordant results. In this way, the life of the memory device 50 is further prolonged.

Figure 9:
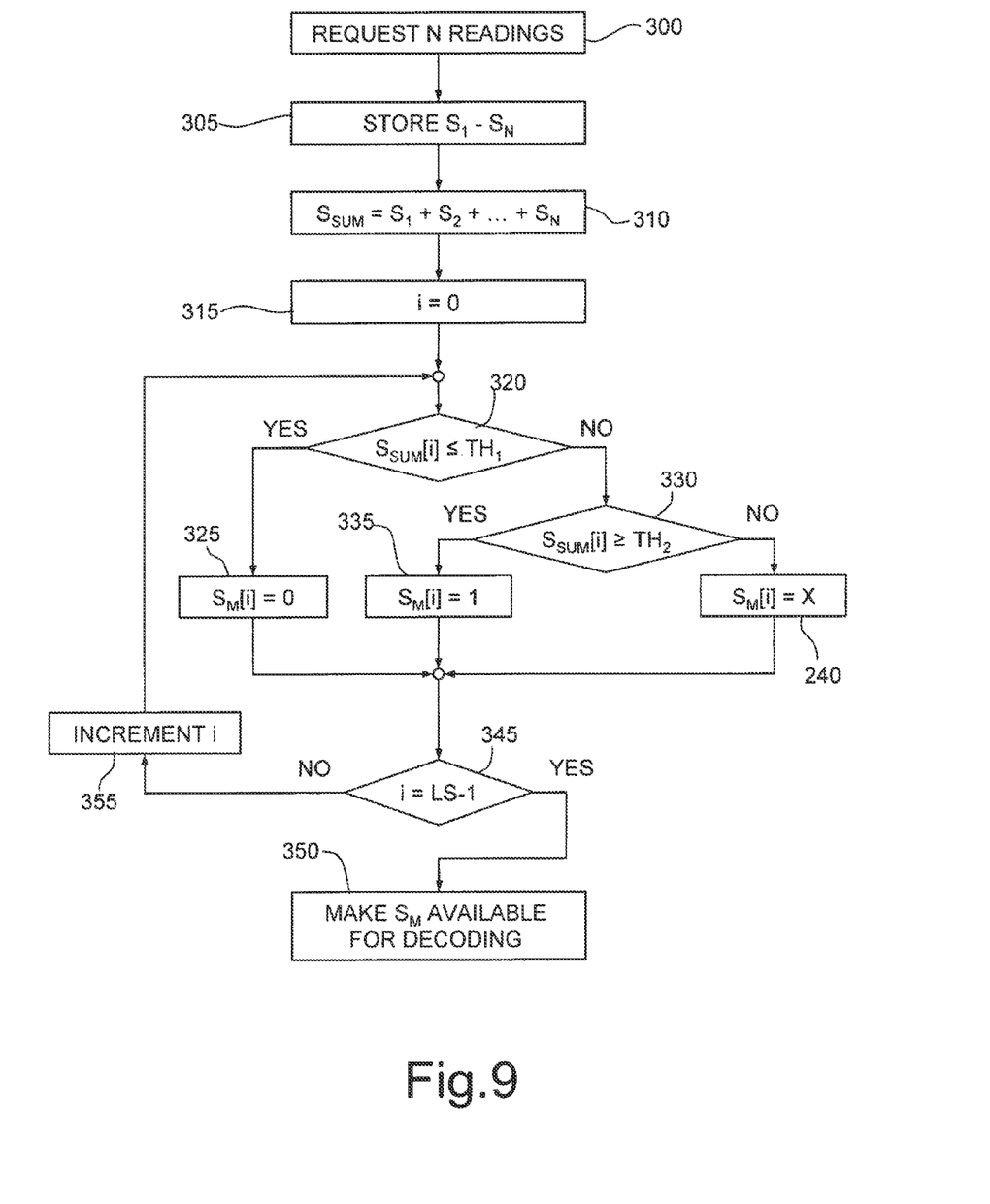
FIG. 9 shows a flowchart relating to the method according to the third embodiment of the invention.

According to a third embodiment of the invention, the erasure-locator module 52 is configured for executing the location and correction procedure illustrated in the flowchart of FIG. 9.

As in the previous case, upon activation, the erasure-locator module 52 requests a multiple re-reading of the memory locations $A_0, A_1, \ldots, A_{LS-1}$ already read (block 300). In all, N recovered strings $S_1, S_2, \ldots, S_N$ (for example, N=5) are thus acquired and stored in respective read registers 53 (block 305).

Figure 8:
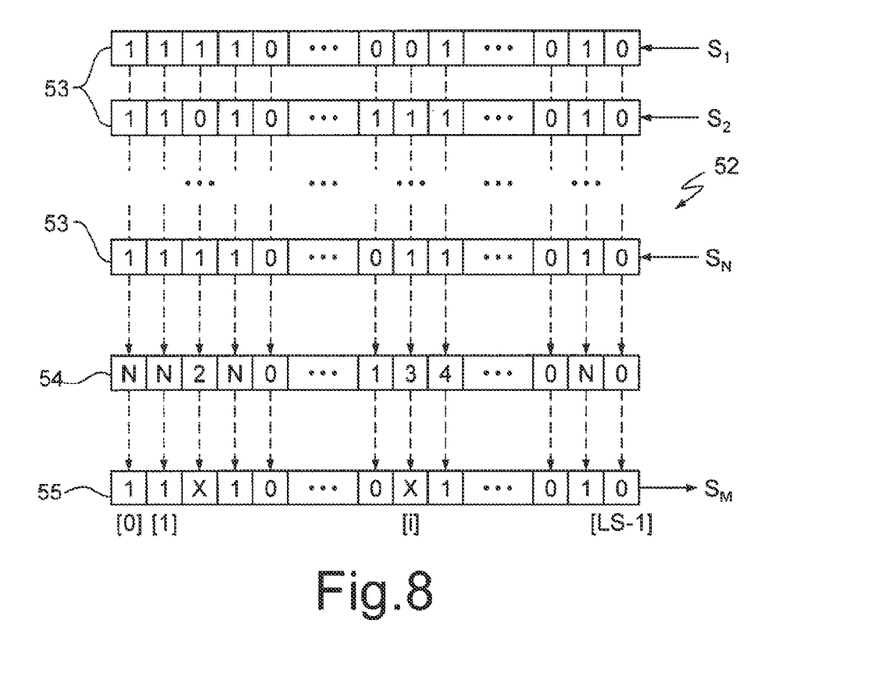
FIG. 8 is a detailed block diagram of a part of a memory device implementing a reading method according to a third embodiment of the present invention.

A bit-to-bit addition is made on the recovered strings $S_1, S_2, \ldots, S_N$, and the results are stored in corresponding positions of the sum register 54, defining therein a sum string $S_{SUM}$ (block 310). As shown in FIG. 8, where the erasure-locator module 52 is illustrated, the generic i-th position $S_{SUM}[i]$ of the sum string $S_{SUM}$ contains an integer comprised between 0 and N and equal to the number of bits with value 1 stored in the corresponding i-th positions of the recovered strings $S_1, S_2, \ldots, S_N$.

The sum string $S_{SUM}$ is scanned to generate a modified string $S_M$ (stored in the auxiliary register 55) and perform location of the erasures. After initializing a counter i (block 315), the erasure-locator module 52 compares the value stored in the current position $S_{SUM}[i]$ of the sum string $S_{SUM}$ indicated by the counter i with a first pre-determined threshold $TH_1$, for example 1 (block 320). If the first threshold $TH_1$ is not exceeded ($S_{SUM}[i] \leq TH_1$, output YES from block 320), the readings have returned with sufficient coherence the value 0, which is assigned to the position $S_M[i]$ of the modified string $S_M$ indicated by the counter i (block 325). Otherwise (output NO from block 320), the value stored in the current position $S_{SUM}[i]$ of the sum string $S_{SUM}$ is compared with a second threshold $TH_2$, greater than the first threshold $TH_1$ and, in the embodiment described herein, equal to $N-TH_1$ (block 330). A non-limiting example is provided by the following values: N=5, TH=1, $TH_2$=4. The first and second thresholds $TH_1, TH_2$ could, however, be asymmetrically chosen, in particular when an error distribution is known a priori, which is also asymmetrical.

If the value stored in the current position $S_{SUM}[i]$ of the sum string $S_{SUM}$ is higher than or equal to the second threshold $TH_2$ ($S_{SUM}[i] \geq TH_2$, output YES from block 330), the readings have returned with sufficient coherence the value 1, which is assigned to the position $S_M[i]$ of the modified string $S_M$ (block 335). Otherwise (output NO from block 330), in the current position $S_{SUM}[i]$ of the sum string $S_{SUM}$ an erasure indicator X is stored, because the readings of the corresponding memory location $A_0, A_1, \ldots, A_{LS-1}$ are not sufficiently concordant (block 340).

If the counter i indicates that the entire sum string $S_{SUM}$ has been scanned (i.e., i=LS-1, output YES from block 345), the modified string $S_M$ is made available to the decoding module 10 (block 350) for being decoded as already explained with reference to FIG. 4 (substitution of the erasure indicators with the value 0 and second decoding attempt; possibly, in the case of failure of the second decoding attempt, substitution of the erasure indicators with the value 1 and third decoding attempt). If, instead, the scanning of the sum string $S_{SUM}$ is not yet terminated (output NO from block 345), the counter i is incremented (block 355), and the operations indicated in blocks 320-340 are repeated.

The embodiment of the invention described above enables correction of the positions, in which, even though there is not total concordance in the results of successive readings, there is in any case sufficient prevalence of one value. Also in this case, in fact, the corresponding bits of the recovered strings are in practice compared with one another, and the value of the bit in the corresponding position of the sum string $S_M$ is decided on the basis of the result of the comparison. If there is sufficient prevalence of one value, also the value of the bit in the corresponding position of the sum string $S_M$ is determined. Otherwise, an erasure is located, and an erasure indicator X is inserted in the sum string $S_M$.

Note that the second embodiment of the invention corresponds to a particular case of the third embodiment, in which $TH_1$=0 and $TH_2$=N.

In addition, according to a variant (not illustrated) the reading method described with reference to FIGS. 5-7 (second embodiment) is initially executed, and, in the case of failure, the method described with reference to FIGS. 8 and 9 (third embodiment) is executed. The procedure of FIGS. 8 and 9, in fact, corrects directly some errors if bits in corresponding positions of the recovered strings $S_1, S_2, \ldots, S_N$, are not all concordant but there is sufficient prevalence of a value. Consequently, a smaller number of erasures is generated on average, and the inequality (1) is more readily satisfied.

Figure 10:
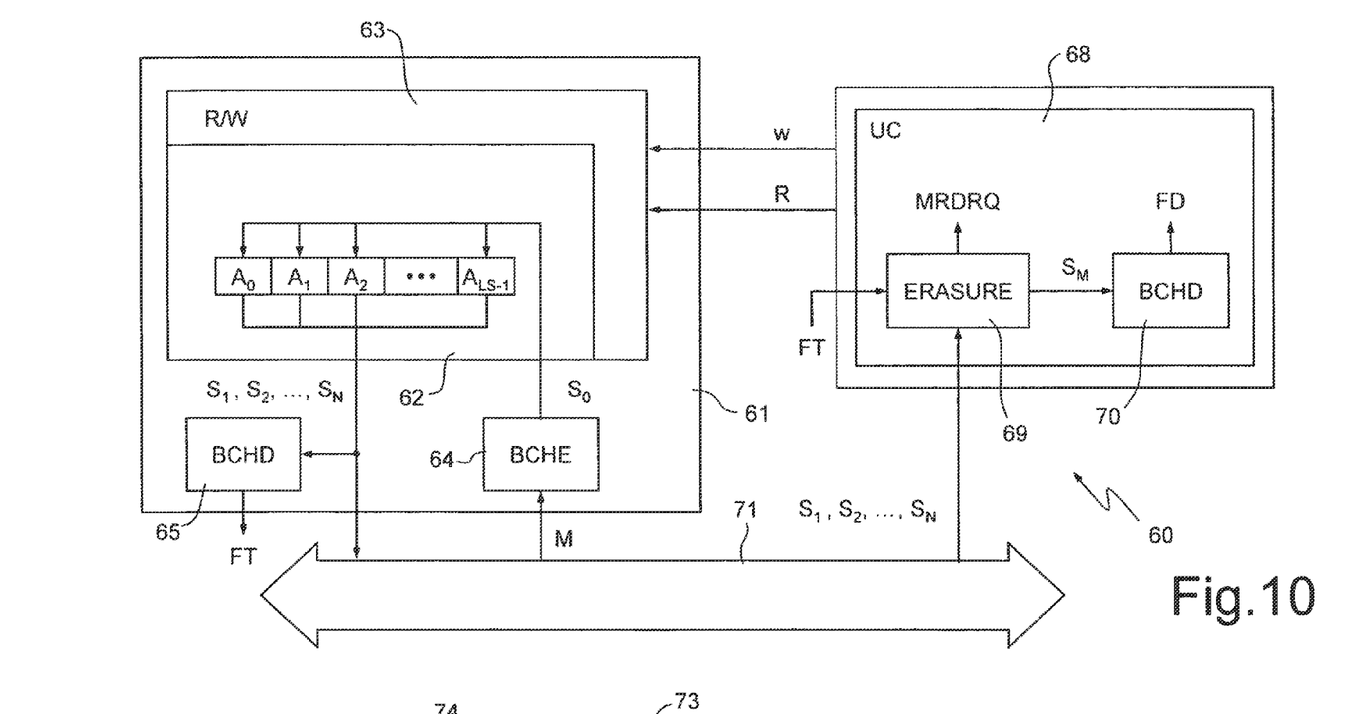
FIG. 10 is a simplified block diagram of a memory device implementing a reading method according to a fourth embodiment of the present invention.
Figure 11:
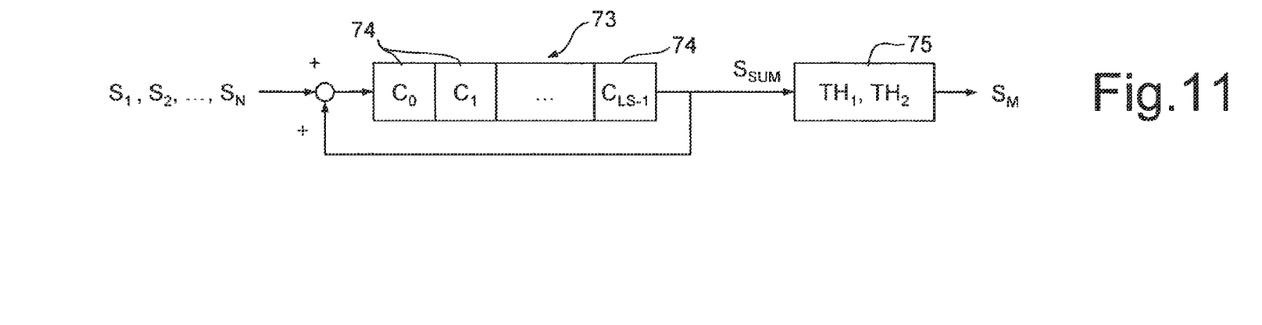
FIG. 11 is a detailed block diagram of a part of the memory device of FIG. 10.

FIGS. 10 and 11 illustrate a fourth embodiment of the invention. In this case, a memory device 60 comprises: a first chip 61, integrated in which are an array 62 of memory cells, a R/W circuit 63 and a first decoding module 65; and a second chip 67, integrated in which is a control unit 68, which includes an erasure-locator module 69 and a second decoding module 70. The first chip 61 and the second chip 67 are moreover connected and communicate with one another by means of a data bus 71.

The first and second decoding modules 65, 70 are both based upon the use of the BCH code used for encoding messages to be stored in the array 62.

When a writing operation is carried out, a message M of a pre-determined length is encoded, in a way known and not illustrated in detail, using the BCH code. Then, an origin string $S_0$ of length LS, obtained from encoding of the message M, is loaded on the data bus 71 and then stored in the array 3 at memory locations $A_0, A_1, \ldots, A_{LS-1}$. For this purpose, the control unit 2 issues a write command W appropriately synchronized to the R/W circuit 5.

In the step of reading of the memory locations $A_0, A_1, \ldots, A_{LS-1}$, following upon a read command R imparted by the control unit 68, a recovered string $S_1$ of length LS is set on the data bus 71 and, moreover, is loaded both into the first decoding module 65, so as to be decoded, and into the erasure-locator module 69. The first decoding module 65 carries out a first decoding attempt. If this is unsuccessful, the first decoding module 65 generates a temporary-failure signal FT, which activates the erasure-locator module 69 for executing a procedure of location and correction substantially as described with reference to FIG. 9 (except for what will be specified hereinafter).

In the embodiment described herein, the erasure-locator module 69 comprises a sum register 73, including a number of counters 74 equal to the length LS of the recovered string $S_1$, and a threshold comparator 75 (FIG. 11).

Initially, in practice, the erasure-locator module 69 stores each position of the recovered string $S_1$ in a respective counter 74 of the sum register 73. After activation, the erasure-locator module 69 requests a multiple re-reading of the memory locations $A_0, A_1, \ldots, A_{LS-1}$ already read, by means of a multiple read-request internal signal MRDRQ. In this way, in all N recovered strings $S_1, S_2, \ldots, S_N$ are sequentially acquired (for example N=5). In the embodiment described herein, each recovered string $S_2, \ldots, S_N$, just made available, is added to the contents of the sum register 73, and the results of the adding operation is again stored in the sum register 73 itself (in practice, each counter 74 is incremented if in the corresponding position of the last recovered string $S_2, \ldots, S_N$ made available the value "1" is present, and remains unaltered otherwise).

Hence, at the end of the N readings, the sum register 73 contains a sum string $S_{SUM}$, which is supplied to the threshold comparator 75. The threshold comparator 75 compares the contents of each position $S_{SUM}[i]$ of the sum register 73 with a first threshold $TH_1$ and a second threshold $TH_2$ and, on the basis of the comparison, assigns to the corresponding position of a modified string $S_M$ the value "1", the value "0", or else an erasure indicator X, using the procedure already described with reference to blocks 320-355 of FIG. 9 (note that, with $TH_1=0$ and $TH_2=N$ the procedure coincides in effect with blocks 220-255 of FIG. 7).

The sum string $S_{SUM}$ is then made available to the second decoding module 70, which executes the decoding procedure already described with reference to FIG. 4.

In practice, storage of the recovered strings $S_2, \ldots, S_N$ and their addition are executed simultaneously, thus obtaining a saving in terms of time and of area occupied (just the sum register 73 is sufficient, instead of a register for each re-reading).

Finally, it is evident that modifications and variations can be made to the method and device described herein, without departing from the scope of the present invention, as defined in the annexed claims. In particular, the messages to be stored could be encoded outside the memory device during a preliminary encoding step and presented in an already encoded form to be stored without any further processing. In addition, the memory device can include a read circuit and a write circuit that are separate and independent.

Although preferred embodiments of the device of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An apparatus comprising:
   a read circuit configured to read data from a plurality of storage locations; and
   an error-corrector to compare first data read from a first reading of the storage locations and second data read from a second reading of the storage locations, and to generate modified data having an indicator to identify a location of a data error based upon differences in the first and second read data.

2. The apparatus of claim 1, wherein the error-corrector includes a decoding module configured to decode the data from the plurality of storage locations, and an erasure-locator module configured to compare the first data read and the second data and to generate the modified data.

3. The apparatus of claim 2, wherein the erasure-locator module is selectively activatable when the decoding module fails a first decoding attempt of the data from the plurality of storage locations.

4. The apparatus of claim 1, wherein the error-corrector is configured to compare the first data and the second data on a bit-to-bit basis.

5. The apparatus of claim 4, wherein the error-corrector is configured, if bits in corresponding positions of the first data and of the second data have a same value, to assign the same value to a bit in a corresponding position of the modified data.

6. The apparatus of claim 1, wherein the error-corrector is configured to generate the modified data by:
   assigning a first value to a position of the modified data if a sum of bits contained in corresponding positions of the second data is less than or equal to a first threshold;
   assigning a second value to the position of the modified string if the sum of bits contained in corresponding positions of the second data is greater than or equal to a second threshold greater than the first threshold; and
   associating the indicator to the position of the modified string if the sum of bits in corresponding positions of the second data is between the first threshold and the second threshold.

7. A memory comprising:
   memory cells for storing data; and
   an error-corrector to compare a first string of data generated from a first reading of a plurality of memory cells and a second string of data read generated from a second reading of the plurality of memory cells, to compare the first and second strings of data, and to generate a modified data string having an indicator to identify a location of a data error based upon differences in the first and second data strings.

8. The memory of claim 7, wherein the error-corrector is selectively activatable when the decoding module fails a first decoding attempt, and wherein the error-corrector is configured to execute the first decoding attempt using the first string and execute a second decoding attempt using the modified string.

9. The memory of claim 7, wherein the error-corrector is configured to determine if bits in corresponding positions of the first string and of the second string have different values, and store the indicator in the corresponding position of the modified string.

10. The memory of claim 7, wherein the error-corrector is configured, if bits in corresponding positions of the first string and of the second string have a same value, to assign the same value to a bit in a corresponding position of the modified string.

11. The memory of claim 7, wherein the error-corrector is configured to assign a first value to a position of the modified string if a sum of bits contained in corresponding positions of the second string is equal to 0.

12. The memory of claim 11, wherein the error-corrector is configured to assign a second value to a position of the modified string if a sum of bits in corresponding positions of the second string is equal to a total number of the first and second readings.

13. A method comprising:
   generating a first data string based on a first reading of a plurality of memory locations and a second data string based on a second reading of the plurality of memory locations;
   comparing the first data string and the second data string; and
   generating, based on the comparing, a modified string having an erasure indicator corresponding to a location of an error.

14. The method of claim 13, wherein the generating the first data string comprises generating the first data string based on a first reading of a plurality of memory locations and wherein said generating the second data string comprises generating the second data string based on a second reading of the plurality of memory locations.

15. The method of claim 13, further comprising performing the first reading and the second reading of the plurality of memory locations.

16. The method of claim 13, wherein the modified string is a first modified string, and wherein the method further comprises executing a second decoding attempt by:

assigning a first value to a bit in a position of the first modified string corresponding to the erasure indicator to generate the first modified string; and executing the second decoding attempt using the first modified string.

17. The method of claim 16, further comprising, if the second decoding attempt fails, assigning a second value to the bit in the position of the modified string corresponding to the erasure indicator to generate the second modified string, and executing a third decoding attempt using the second modified string.

18. The method of claim 13, wherein the comparing comprises, if bits in corresponding positions of the first data string and of the second data string have a same value, assigning the same value to a bit in a corresponding position of the modified string.

19. The method of claim 13, wherein the comparing comprises:

assigning a first value to a position of the modified string if a sum of bits contained in corresponding positions of the second data string is equal to 0; and assigning a second value to a position of the modified string if a sum of bits in corresponding positions of the second data string is equal to a total number of the first and second readings.

20. The method of claim 13, wherein the generating the modified string comprises:

assigning a first value to a position of the modified string if a sum of bits contained in corresponding positions of the second data string is less than or equal to a first threshold;

assigning a second value to the position of the modified string if the sum of bits contained in corresponding positions of the second data string is greater than or equal to a second threshold greater than the first threshold; and associating the erasure indicator to the position of the modified string if the sum of bits in corresponding positions of the second data string is between the first threshold and the second threshold.

* * * * *

UNITED STATES PATENT AND TRADEMARK OFFICE
CERTIFICATE OF CORRECTION

PATENT NO. : 8,347,201 B2  
APPLICATION NO. : 13/047678  
DATED : January 1, 2013  
INVENTOR(S) : Alessia Marelli et al.

Page 1 of 1

It is certified that error appears in the above-identified patent and that said Letters Patent is hereby corrected as shown below:

In column 10, line 62, in Claim 14, after "wherein" delete "the".

In column 11, lines 1-3, in Claim 15, delete "15. The method of claim 13, further comprising performing the first reading and the second
   reading of the plurality of memory locations." and
insert -- 15. The method of claim 13, further comprising performing the first reading and the second reading of the plurality of memory locations. --, therefor.

In column 12, line 10, in Claim 20, after "wherein" delete "the".

Signed and Sealed this
Twenty-sixth Day of March, 2013

Teresa Stanek Rea
*Acting Director of the United States Patent and Trademark Office*